United States Patent [19]

Fujimura

[11] Patent Number: 4,852,103
[45] Date of Patent: Jul. 25, 1989

[54] CODE ERROR DETECTING CIRCUIT

[75] Inventor: Hiroshi Fujimura, Tokyo, Japan

[73] Assignee: NEC Corporation, Japan

[21] Appl. No.: 154,843

[22] Filed: Feb. 10, 1988

[30] Foreign Application Priority Data

Feb. 10, 1987 [JP] Japan ................................ 62-27228

[51] Int. Cl.[4] .............................................. G06F 11/08
[52] U.S. Cl. ........................................ 371/55; 371/68
[58] Field of Search ................... 371/55, 68, 70, 72, 371/67

[56] References Cited

U.S. PATENT DOCUMENTS

| 3,195,107 | 7/1965 | Rudolph | 371/68 |
| 3,409,875 | 11/1968 | Jager et al. | 371/68 |
| 4,682,334 | 7/1987 | Le Mouel et al. | 371/55 |
| 4,779,261 | 10/1988 | Yamagishi et al. | 370/16 |

Primary Examiner—Charles E. Atkinson
Attorney, Agent, or Firm—Ostrolenk, Faber, Gerb & Soffen

[57] ABSTRACT

To reduce signal rate in connection with a code error detecting circuit for handling transmitted signals encoded in accordance with an mB1C code, the transmitted signal is divided into a plurality of p parallel signals each of which has a bit rate 1/p of the bit rate of the input signal. The number of parallel signals p is restricted to meet the condition that the product of $(m+1) \times p$ is equal to the smallest number which is a multiple of both $(m+1)$ and p. The parallel secondary signals are delayed relatively to one another in a manner which guarantees that the error codes contained in them coincide. The secondary signals are then exclusive ORed with one another and the exclusive ORed output is directed to an error detection circuit to detect whether an error has occurred in the input signal.

15 Claims, 4 Drawing Sheets

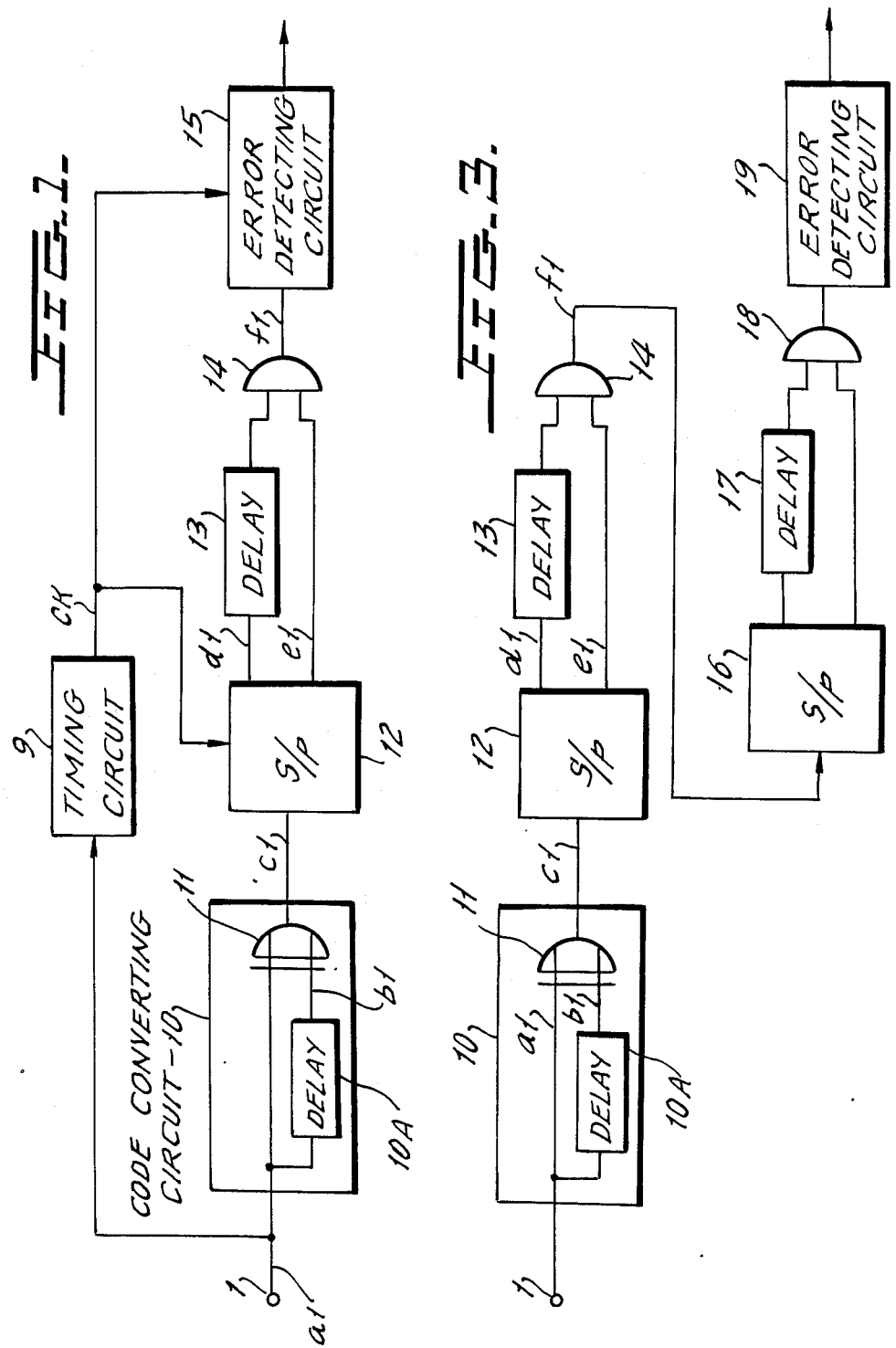

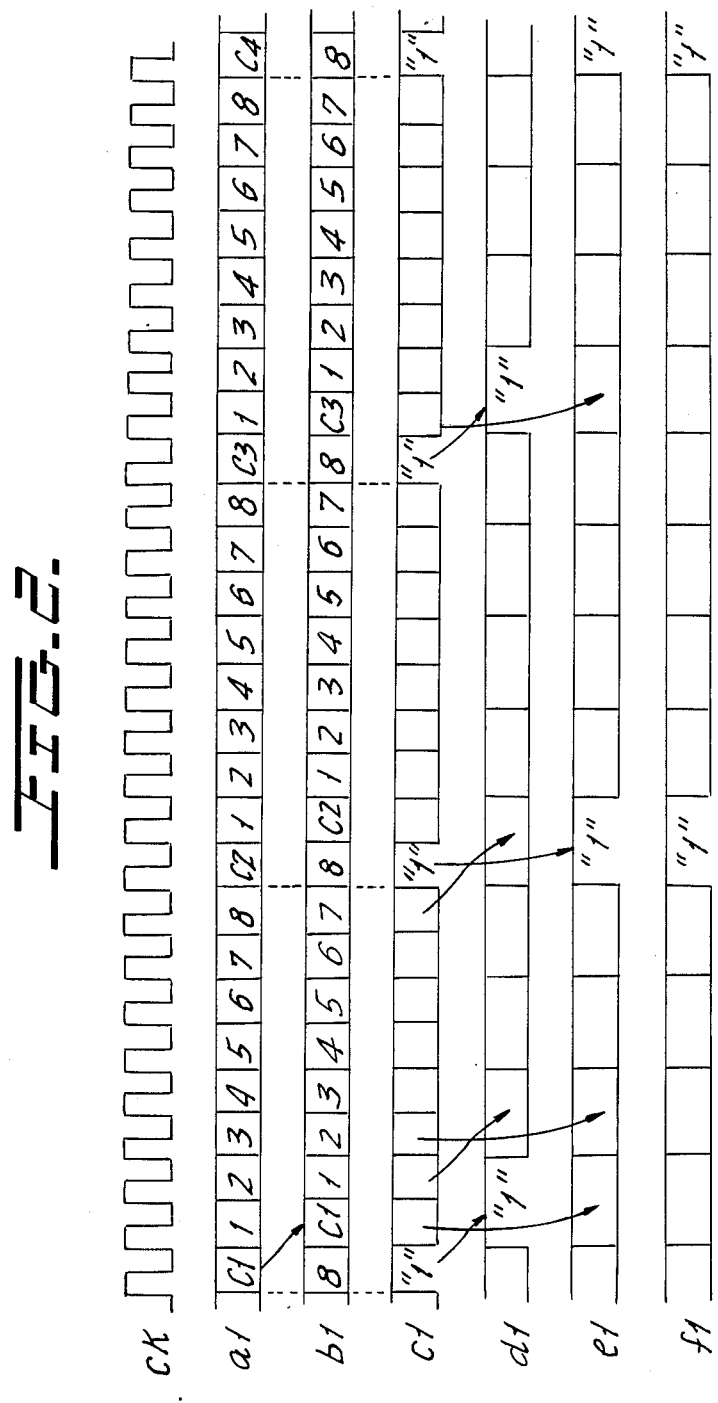

FIG. 5.

CODE ERROR DETECTING CIRCUIT

BACKGROUND OF THE INVENTION

The present invention relates to a code error detecting circuit for high speed digitally transmitted signals, and more particularly to a circuit for detecting, in a sequence of transmitted signals into which a one-bit specific code is inserted at every m bits, the specific code and any code error in that code.

The mB1C code is well known as a code for this kind of a sequence of transmitted signals. According to the mB1C coding rule, the mB1C code is such that a one-bit specific code is inserted in specific bit position for every m bits. The speific code is a complementary code to the immediately preceding bit. An error in the mB1C code is detected as a code error in specific bit positions.

More specifically, there is generated a signal sequence in which the same code (of "1") always occurs at m-bit intervals and this is generated with exclusive ORing (EX-OR) of an mB1C-coded transmitted signal and a signal delayed by one bit from that signal. The signal sequence is supplied to a low-pass filter and a comparator to detect any error in the specific code. (See "Ultra-High Speed In-Service Error Detection Circuit" by Fujimoto et al, National Conference Record, 1985, Information and Systems, the Institute of Electronics and Communication Engineers of Japan, Toyohashi, Nov. 23-26, 1985. If there is an error in any specific code of the mB1C-coded signal sequence, a signal of "1" will, at times, be missing at m-bit intervals from the EX-OR output where it is expected. Consequently the average D.C. level will fluctuate, resulting in variation of the output level of the low-pass filter. This error is detected by detecting the transition points of the output of the low-pass filter with the comparator.

The above described code error detecting circuit of the prior art cannot, however, detect a code error if the interval between code errors is short (of error rate over $10^{-4}$) in specific codes in a sequence of transmitted signals, because the output of the low-pass filter would hardly fluctuate in this case. Moreover, since analog circuits are used in the low-pass filter and in the comparator, there are relatively many circuit elements which require adjustment.

SUMMARY OF THE INVENTION

An object of the present invention is to provide an entirely digital code error detecting circuit which avoids the use of any analog circuits.

Another object of the invention is to provide a circuit for detecting, from a sequence of high speed digitally transmitted signals which contain a one-bit specific code at every m bits, a code error in the specific code.

Still another object of the invention is to provide a circuit for detecting a code error in a sequence of mB1C-coded high speed transmitted signals.

Still further object of the invention is to provide an error detection circuit which is capable of detecting an error in a high bit rate digital transmission stream by reducing the bit rate in the detecting circuit.

According to one aspect of the invention, there is provided a code error detecting circuit for detecting, in a sequence of input signals containing a specific bit which consists of a complementary code to the code at the predetermined preceding bit at every m bits, a code error in said specific bit. The code error detecting circuit comprises code converting means responsive to the input signal sequence for providing a first bit stream having the complementary codes converted into a predetermined first code, serial/parallel converting means responsive to the first bit stream for converting it into p channel parallel bit streams of a rate equal to 1/p of that of the input signal sequence, wherein p is an integer which satisfies a condition that the product of (m+1) and p equal to the least common multiple of (m+1) and p, delay means for delaying any of the p channel parallel bit streams to generate a delayed bit stream or streams so that each of the first codes in the delayed bit streams and the rest of the p channel parallel bit streams appears in the same time slot, gate circuit means for comparing the delayed bit stream(s) and the rest of the parallel bit streams and for generating a second bit stream which contains a second code different from the first code in specific bit positions where the first code normally appears when there is an error in the specific bit, and error detecting means responsive to the second bit stream for detecting a code error by detecting the second code.

Further, according to another aspect of the invention, there is provided a code error detecting circuit for detecting, from a sequence of input signals into which a specific bit of a first code of the same kind is inserted for every m bits, a code error in the specific bit. The code error detecting circuit comprises serial/parallel converting means for converting the input signal sequence to p channel parallel bit streams each having a rate equal to 1/p of that of the input signal sequence, wherein p is an integer which satisfies a condition that the product of (m+1) and p equals to the least common multiple of (m+1) and p, delay means for delaying any of the p channel parallel bit streams to generate a delayed bit stream or streams so that each of the first codes in the delayed bit stream(s) and the rest of the p channel parallel bit streams appears in the same time slot, gate circuit means for simultaneously comparing delayed bit stream(s) and the rest of the p channel parallel bit streams and for generating a second bit stream which contains a second code different from the first code in specific bit positions where the first code normally appears when there is an error in the code of the specific bit, and error detecting means responsive to the second bit stream for detecting a code error by detecting the second code.

BRIEF DESCRIPTION OF THE DRAWINGS

The above and other objects, features and advantages of the present invention will become more apparent from the following detailed description taken in conjunction with the accompanying drawings, in which:

FIG. 1 is a block diagram illustrating a first preferred embodiment of the invention;

FIG. 2 is a timing chart illustrating how different parts of the embodiment of FIG. 1 operate;

FIG. 3 is a block diagram illustrating a second preferred embodiment of the invention;

FIG. 5 is a timing chart illustrating how different parts of the embodiment of FIG. 4 operate;

DETAILED DESCRIPTION OF THE PREFERRED EMBODIMENTS

Figure 4:
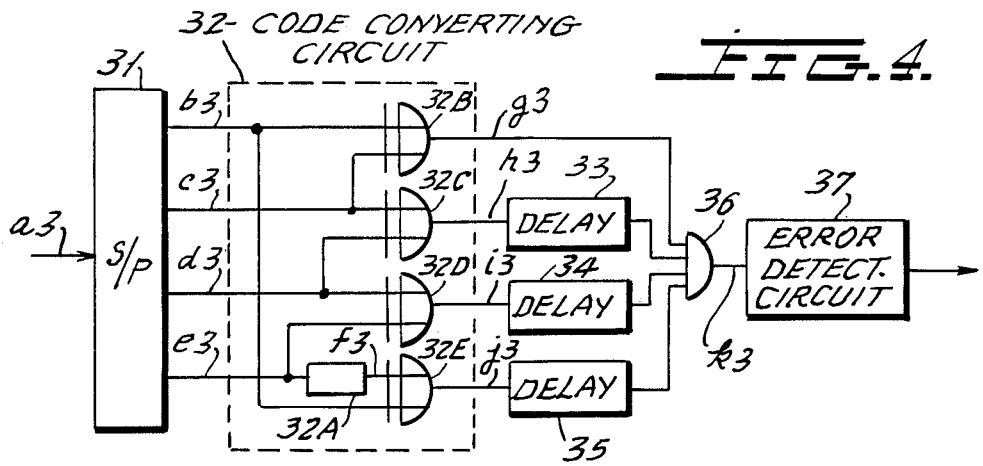
FIG. 4 is a block diagram illustrating a third preferred embodiment of the invention.

An error detecting circuit for a sequence of mB1C-codes line code signals containing a one-bit specific code, which is a complementary to the code of the immediately preceding bit, at every m bits is described below.

FIG. 1 illustrates a first preferred embodiment of the present invention, providing an error detecting circuit for 8B1C-coded (m=8) input signals. In the figure, al through fl represent the lines connecting the various blocks and the corresponding signals appearing thereon. 8B1C-coded input signals al supplied to an input terminal 1 have, as shown in FIG. 2, one-bit specific bits C1, C2, C3, ... for every eight data bits (represented by numerals 1 to 8 in the figure). The codes of each specific bit is the complementary codes to the immediately preceding bit.

A timing circuit 9 generates a timing clock signal ck from the input signal al. A code converting circuit 10, having a one-bit delay circuit 10A, an exclusive OR (EX-OR) gate 11, and the serial/parallel converting circuit 12 cooperate to convert the specific bits C1, C2, ... of the input signals al into the same codes. The EX-OR gate 11 simultaneously receives, every eight-bit interval, the specific bits C1, C2, ... and their complementary codes (numeral 8). The output signal cl of gate 11 is always "1" in the specific bits as long as no errors occur in the specific bits and in their immediately preceding bits. Alternate bits of output signals cl are separated and directed to two output channels by means of a serial/parallel converting circuit (an s/p circuit) 12 which output one signal d7 and another output el. The dl signal is delayed by a four-bit delay circuit 13 and, both the delayed signal and the el signal are supplied to an AND gate 14. The rate of each of the output signals of the s/p circuit 12 is reduced by 178 in consequence of the separating process applied to signal cl. As noted above, the delay circuit 13 applies a four bit delay to the signal dl. As a result, the "1" codes of both signals dl and el are synchronized to occur simultaneously as they enter AND gate 14.

If there is no code error in the input signals, the AND gate 14 will output the signals fl, in which "1" codes will be generated at eight-bit intervals. But if there is any error in the specified bits C1, C2, ... of the input signals, the output cl of the EX-OR gate 11 will turn from "1" to "0", and the output fl of the AND gate 14 will have a "0", instead of a "1", at eight-bit intervals. An error detecting circuit 15 counts the number of times the "1"s in the output fl have been replaced with "0"s within a prescribed period of time, and generates an error detection output signal if the count is relatively great.

Figure 7:
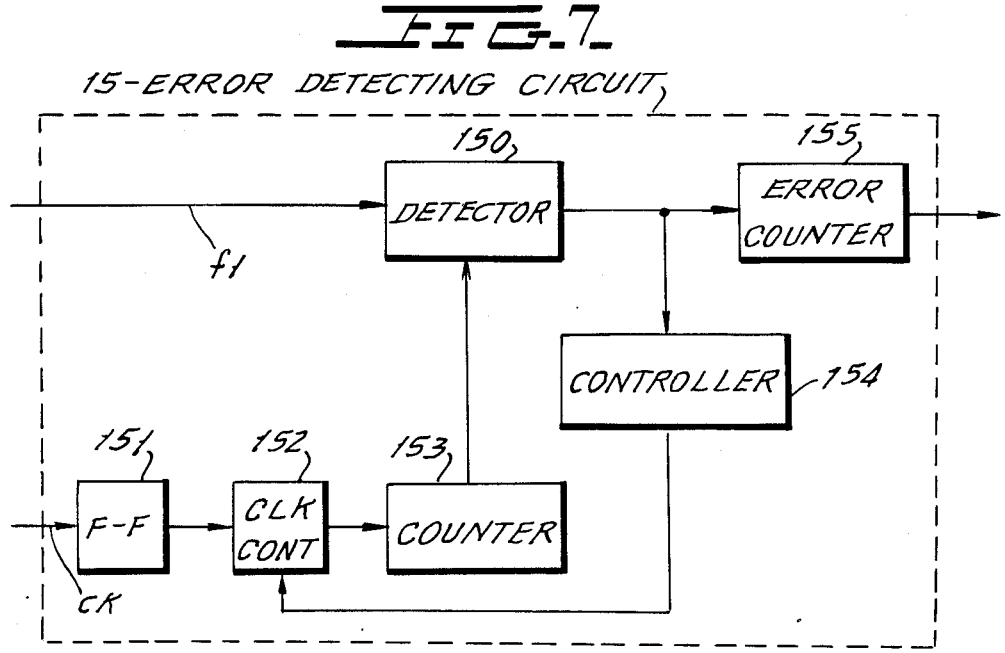
FIG. 7 is a block diagram illustrating an error detecting circuit of the first preferred embodiment.

In FIG. 7, error detecting circuit 15 comprises a detector 150 for detecting, from the signal fl, the appearance of "0" codes which reflects code errors of "1" codes generated at 8 bit intervals, an error counter 155 for counting the code errors and generating the number of errors, and circuits 151, 152, 153, 154 for establishing synchronization with the "1" codes in the signal fl.

A clock ck is divided by two in a flip-flop 151 and then provided to the clock control circuit 152 which inhibits the divided clocks in response to inhibit pulses from the controller circuit 154. The counter 153 is a divided-by-nine counter which controls a detection timing of the detector 150. The detector 150 produces error pulses upon receipt of "0" codes. The controller 154 generates inhibit pulse responsive to error pulses. Once synchronization is established, the detector circuit 150 outputs error pulses in the specific bits of the input signal sequence, only when errors occur in the specific bits.

With this embodiment, there will be no difference in the output of the AND gate 14 whether the specific bits C1, C2, C3, ... in the input signals are erroneous consecutively or at every other bit. However, since the ratio of code errors on a transmission path is $10^{-3}$ through $10^{-6}$, and the intervals of erroneous code occurence are relatively long, there will be no deterioration in the accuracy of error detection. A more important aspect of this embodiment is that the rate of signals processed by the detecting circuit 15 is $\frac{1}{2}$ of that of the input signals al. The higher the signal rate of the input signals, the more difficult it is to realize a detecting circuit therefor, so that the reduced signal rate is beneficial economically as well as for the realization of the detecting circuit 15.

Although the s/p converter disclosed above converts a bit stream to two bit streams, division into a larger number of bit streams is possible. The number p of bit streams or channels can be determined such that "1" codes are alternately distributed and "1" codes periodically (at eight-bit intervals) emerge in each channels. Mathematically speaking with respect to mB1C coded signal, such channel numbers p are permitted which allow the product of (m+1) and p to equals the least common multiple of (m+1) and p. Stated another way, the product of (m+1) and p must equal that number which is an integer multiple of both (m+1) and p and, moreover, the smallest such number. Since m=8 in FIG. 1, the channel number p can be 4,5 or 7 besides 2.

Referring now to FIG. 3, a second preferred embodiment of the present invention includes a combination of another s/p circuit 16, a delay circuit 17 and an AND gate 18, all of which follow the AND gate 14 of the code error detecting circuit of FIG. 1. An error detecting circuit 19 has a signal processing rate $\frac{1}{2}$ that of the error detecting circuit 15, and is connected to AND gate 18. The s/p circuit realizes serial/parallel conversion in the same manner as circuit 12 except that its signal processing rate is $\frac{1}{2}$ that of circuit 12. The delay circuit 17 delays by four bits the signals whose rate is $\frac{1}{2}$ of that of signals entered into the delay circuit 13. The detecting circuit 19, which detects errors in the specific bits at a processing speed equal to $\frac{1}{4}$ of that of the input signals al, can be composed of slower circuit elements than those present in detecting circuit 15. The count of errors will be the same whether the specific signals C1, C2, ... of the input signals al are erroneous four consecutive times or only once in four consecutive times, but there will hardly be a deterioration in the accuracy of error detection because, as stated above, the usual ratio of code errors is low.

If a combination of an s/p circuit, a delay circuit and an AND gate is connected in tandem in N stages, the signal processing rate of the error detecting circuit will be reduced to $\frac{1}{2^N}$, so that the error detecting rate will be further slowed down.

Figure 5:
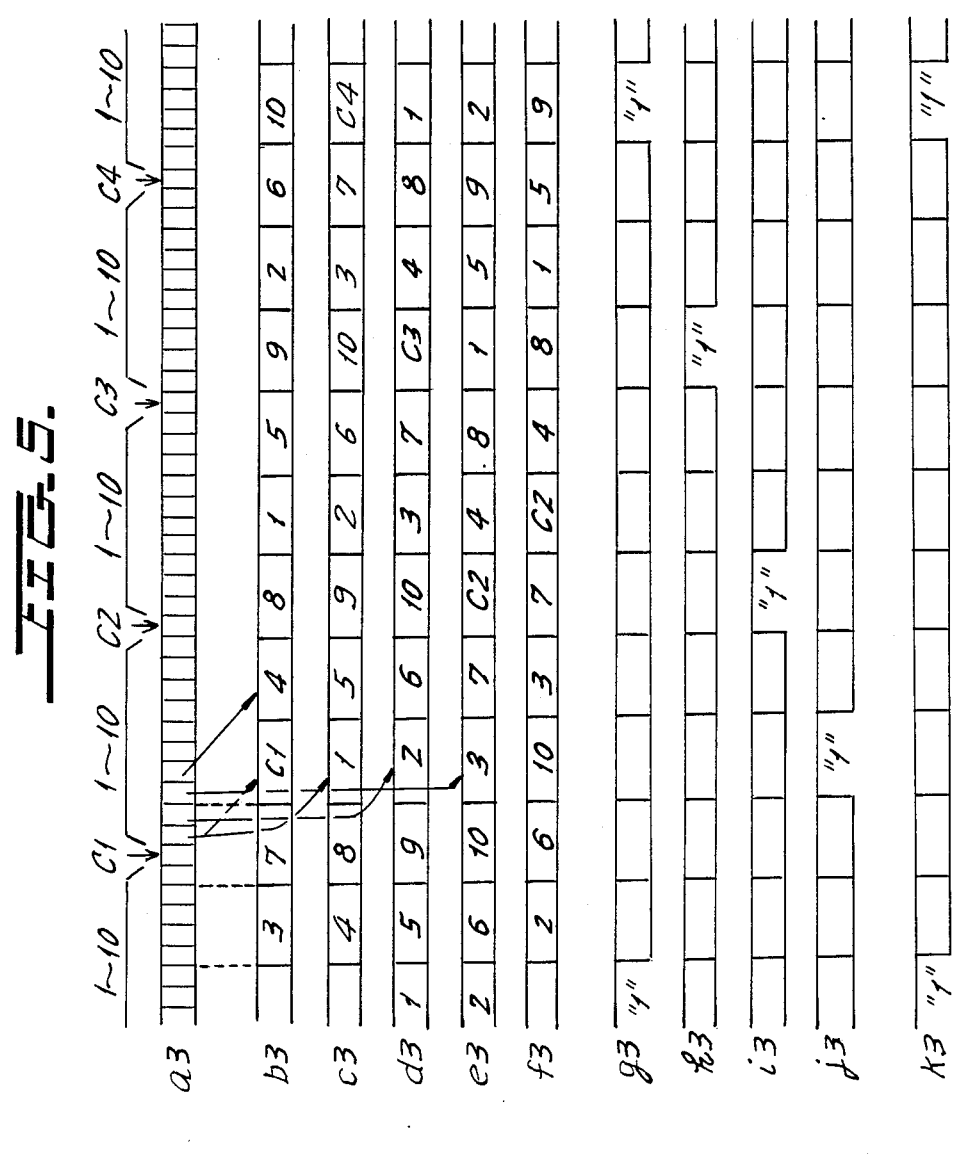

FIG. 4 illustrates a third preferred embodiment of the present invention for 10B1C-coded input signals. The error detecting circuit has a circuit 31 for dividing input signals a3, shown in FIG. 5, among four channels, one bit per channel, to reduce the signal rate to $\frac{1}{4}$. A code converting circuit 32 converts the specific bits C1, C2, ... among the output signals of the channels into "1" codes. Delay circuits 33, 34 and 35 are provided for timing the periodic "1" codes such that they are distributed among the signals of the different channels and so that they may appear in the same time slots. There are further provided an AND gate 36 and an error detecting circuit 37 for counting the number of errors in the periodic "1" codes out of the output of the AND gate 36 during a prescribed length of time. The code converting circuit 32 which is connected to the output side of the s/p circuit 31, has the advantage that the code converting circuit 32 can be composed of slower circuit elements.

The rates of output signals b3, c3, d3 and e3 of the s/p circuit 31 are reduced to ¼ by the serial/parallel conversion of the input signals a3. The signals b3 and c3 are outputted to an EX-OR 32B, the signals c3 and d3 to an EX-OR 32C, signals d3 and e3 to an EX-OR 32D, and signals b3 and signal f3, resulting from one-bit delaying of signal e3 by a delay circuit 32A, to an EX-OR 32E. Each EX-OR is simultaneously fed with the specific bits C1, C2, ... and the bits (numeral 10) immediately preceding them with the result that outputs g3, h3, i3 and j3 become signal sequences in which a "1" code occurs at 10-bit intervals. The outputs h3, i3 and j3 are delayed by the delay circuits 33, 34 and 35 by three, six and eight bits, respectively, and as a result the "1" codes, which occur at 10-bit intervals, are fed to the AND gate 35 simultaneously. Therefore, if there is an error in any one of consecutive four of the specific bits C1, C2, ... of the input signals a3, the output of one of the EX-ORs 32B to 32E will become "0", and the "1" code outputted from the AND gate 36 at 10-bit intervals will turn "0". The error detecting circuit 37, which detects any error in the specific bits according to an output k3 of the AND gate 36, can be composed of slower circuit elements because the signal rate of the output k3 is ¼ that of the input signals a3.

Next there is described an error detecting circuit for detecting errors in specific bits in a signal sequence into which a specific bit consisting of the same one-bit code is inserted for every m bits.

Figure 6:
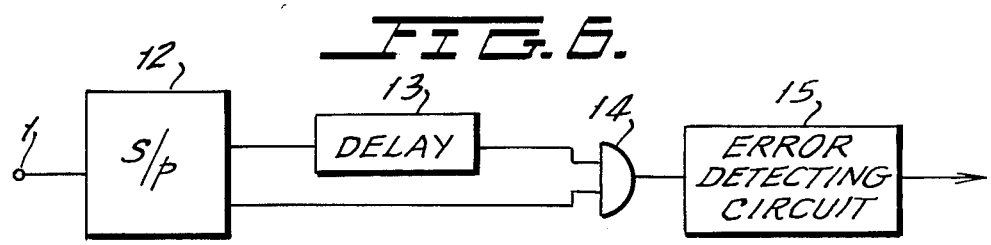
FIG. 6 is a block diagram illustrating a fourth preferred embodiment of the invention.

In FIG. 6, a circuit for a fourth embodiment of the invention is the same as the code error detecting circuit of FIG. 1 except that the code converting circuit is omitted. The description of a circuit operation is skipped for simplicity since its operation is quite similar to that of FIG. 4. When the specific bit is "0", an EX-OR gate is used instead of the AND gate 14. In this case, if any error occurs in the specific bits the code of the periodic "0" bits of the EX-OR gate's output will turn "1" to enable detection of the error.

As described above the present invention makes it possible to reduce the signal rate for detection of code errors in specific bits according to the number of output channels of the s/p circuit, so that a relatively compact and low cost code error detecting circuit can be provided.

Although the embodiments of FIGS. 1 and 3 employ an mB1C code wherein the error code is the complement of the immediately proceeding bit, the complementary code may be set by reference to a specified bit position other than the immediately proceeding bit. When the penultimate bit of m bits is used to for generating the complementary code, the one-bit delay circuit 10A may simply be replaced by a two-bit delay circuit which delays two bits and no other modification is needed.

What is claimed is:

1. A code error detecting circuit for detecting, from a sequence of input signals into which a specific bit which consists of a complementary code to the code of the predetermined preceding bit is inserted for every m bits, a code error in said specific bit, comprising:

code converting means responsive to said sequence for providing a first bit stream in which said complementary codes are converted into a predetermined first code;

serial/parallel converting means responsive to said first bit stream for converting said first bit stream into a plurality of p parallel bit streams, each of said parallel bit streams having a rate equal to 1/p of that of the input signal sequence and including selected ones of said first code therein, wherein p is an integer which satisfies the condition that the product of (m+1) and p equals the smallest number which is a multiple of both (m+1) and p;

delay means for delaying at least one of said p channel parallel bit streams to generate at least one delayed bit stream in a manner so that each of said first codes in said at least one delayed bit stream and in the remaining ones of said p channel parallel bit streams appear in the same time slot;

gate circuit means for comparing said at least one delayed bit stream and said remaining parallel bit streams and for generating a second bit stream which contains a second code different from said first code in specific bit positions where said first code normally appears when there is an error in said specific bit; and error detecting means responsive to said second bit stream for detecting a code error by detecting said second code.

2. A code error detecting circuit for detecting, from a sequence of input signals into which a specific bit which consists of a complementary code to the code of the predetermined preceding bit is inserted for every m bits, a code error in said specific bit, comprising:

serial/parallel converting means for converting said input signal sequence to first p parallel bit streams of a rate equal to 1/p of that of the input signal sequence, wherein p is an integer which satisfies the condition that the product of (m+1) and p equals the smallest number which is a multiple of both (m+1) and p;

code converting means, responsive to said first parallel bit streams, for providing second p parallel bit streams each having said complementary code converted into a predetermined first code;

delay means for delaying at least one of said second p channel bit streams to generate at least one delayed bit stream so that each of said first codes in said at least one delayed bit stream and in the remaining ones of said second p bit streams appears concurrently;

gate circuit means for comparing said at least one delayed bit stream and the rest of said second p bit streams and for generating a third bit stream which contains a second code different from said first code in specific bit positions where said first code normally appears when there is an error in said specific bit; and error detecting means responsive to said third bit stream for detecting a code error by detecting said second code.

3. A code error detecting circuit for detecting, from a sequence of input signals into which a specific bit of a first code of the same kind is inserted for every m bits, a code error in said specific bit, comprising:

serial/parallel converting means for converting said input signal sequence to p channel parallel bit streams of a rate equal to 1/p of that of the input signal sequence and including selected ones of said first code therein, wherein p is an integer which satisfies the condition that the product of (m+1) and p equals the smallest number which is a multiple of both (m+1) and p;

delay means for delaying at least one of said p channel parallel bit streams to generate at least one delayed bit stream so that each of said first codes in said delayed bit stream(s) and the rest of said p channel parallel bit streams appears in the same time slot;

gate circuit means for simultaneously comparing said at least one delayed bit stream and the rest of said p channel parallel bit streams and for generating a second bit stream which contains a second code different from said first code in specific bit positions where said first code normally appears when there is an error in the code of said specific bit; and error detecting means responsive to said second bit stream for detecting a code error by detecting said second code.

4. Method for detecting errors in an mB1C input signal having a first predetermined error code bit following every m bits thereof and having a first bit rate, said method comprising the steps of:

separating said input signal into a plurality of p secondary parallel bit streams, each said secondary bit stream having a second bit rate which equals 1/p of said first bit rate;

delaying at least one of said secondary bit streams to cause error codes contained in said secondary bit streams to coincide with one another;

combining said secondary bit streams into a second signal; and detecting the presence of errors, if any, in said second signal.

5. The method of claim 4, wherein said p is an integer which satisfies the relationship:

$$(m+1) \times p = L.C.M.$$

wherein L.C.M. denotes the smallest integer which is a multiple of both (m+1) and p.

6. The method of claim 5, further comprising exclusive ORing each said first error code bit in said input signal with a predetermined preceding bit thereof, prior to generating said secondary bit streams.

7. The method of claim 5, further comprising exclusive ORing said error code bits of each of said parallel bit streams with corresponding preceding bits thereof.

8. The method of claim 5, wherein said code is an 8M1C code.

9. The method of claim 5, wherein said code is a 10M1C code.

10. A method for detecting errors in an mB1C input signal having a first predetermined error code bit following every m bits thereof and having a first bit rate, said method comprising the steps of:

separating said input signal into a plurality of p secondary parallel bit streams, each said secondary bit stream having a second bit rate which equals 1/p of said first bit rate;

delaying at least one of said secondary bit streams to cause error codes contained in said secondary bit streams to coincide with one another;

combining said secondary bit streams into a second signal;

separating said second signal into a second set containing a predetermined number of secondary parallel bit streams, each said secondary bit stream of said second set having a bit rate which equals 1 divided by said predetermined number of said second bit rate;

delaying at least one of said secondary bit streams in said second set to cause error codes contained therein to coincide with one another;

combining said secondary bit streams of said second set into a third signal;

detecting the presence of errors, if any, in said third signal; and said p being an integer which satisfies the relationship:

$$(m+1) \times p = L.C.M.$$

wherein L.C.M. denotes the smallest integer which is a multiple of both (m+1) and p.

11. An error detecting circuit for detecting errors in an mB1C input signal having a first predetermined error code bit following every m bits thereof and having a first bit rate, said circuit comprising:

first means for separating said input signal into a plurality of p secondary parallel bit streams, each said secondary bit stream having a second bit rate which equals 1/p of said first bit rate;

delaying means for delaying at least one of said secondary bit streams in a manner which is effective to cause error codes contained in said secondary bit streams to coincide with one another;

means for combining said secondary bit streams into a second signal; and means for detecting the presence of errors, if any, in said second signal.

12. The circuit of claim 11, wherein said p is an integer which satisfies the relationship:

$$(m+1) \times p = L.C.M.$$

wherein L.C.M. denotes the smallest integer which is a multiple of both (m+1) and p.

13. The circuit of claim 12, further comprising exclusive ORing means for exclusive ORing each said first error code bit in said input signal with a predetermined preceding bit thereof, prior to the generation of said secondary bit streams.

14. The circuit of claim 12, further comprising exclusive ORing means for exclusive ORing said error code bits of each of said parallel bit streams with corresponding preceding bits thereof.

15. The circuit of claim 12, further comprising second separating means for separating said second signal into a second set of a plurality of parallel bit streams, second combining means for combining said secondary bit streams of said second set into a third signal, and second detecting means for detecting the presence of errors, if any, in said third signal.

* * * * *